United States Patent
Jha et al.

(10) Patent No.: US 10,839,809 B1
(45) Date of Patent: Nov. 17, 2020

(54) ONLINE TRAINING WITH DELAYED FEEDBACK

(71) Applicant: Amazon Technologies, Inc., Reno, NV (US)

(72) Inventors: Madhav Jha, San Francisco, CA (US); Edo Liberty, New York, NY (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 100 days.

(21) Appl. No.: 15/838,620

(22) Filed: Dec. 12, 2017

(51) Int. Cl.
  *G10L 17/04* (2013.01)
  *H04M 3/22* (2006.01)
  *G10L 15/06* (2013.01)
  *G10L 17/18* (2013.01)

(52) U.S. Cl.
  CPC ............ *G10L 17/04* (2013.01); *G10L 15/063* (2013.01); *G10L 17/18* (2013.01); *H04M 3/2236* (2013.01)

(58) Field of Classification Search
  None
  See application file for complete search history.

(56) References Cited

U.S. PATENT DOCUMENTS

| | | | | |
|---|---|---|---|---|
| 6,064,957 A * | 5/2000 | Brandow | ............ | G06F 40/194 704/235 |
| 8,032,372 B1 * | 10/2011 | Zimmerman | .......... | G06Q 50/24 704/235 |
| 9,058,813 B1 * | 6/2015 | Blanksteen | ............. | G10L 15/19 |
| 9,183,845 B1 * | 11/2015 | Gopalakrishnan | .......................... | G10L 21/0208 |
| 2003/0061041 A1 * | 3/2003 | Junkins | ............... | G10L 19/0018 704/254 |
| 2006/0080105 A1 * | 4/2006 | Lee | .......... | G10L 15/30 704/270.1 |
| 2007/0288242 A1 * | 12/2007 | Spengler | ................ | G10L 15/20 704/275 |
| 2009/0030676 A1 * | 1/2009 | Xu | .......... | G10L 15/02 704/203 |
| 2013/0013311 A1 * | 1/2013 | Zheng | ................... | G10L 15/197 704/257 |
| 2013/0325449 A1 * | 12/2013 | Levien | ................... | G10L 15/30 704/201 |
| 2016/0217793 A1 * | 7/2016 | Gorodetski | ............. | G10L 17/04 |
| 2018/0068655 A1 * | 3/2018 | Cui | ....................... | G10L 15/075 |
| 2019/0266998 A1 * | 8/2019 | Liang | ....................... | G06N 3/08 |

* cited by examiner

*Primary Examiner* — Neeraj Sharma
(74) *Attorney, Agent, or Firm* — Hogan Lovells US LLP

(57) ABSTRACT

Bandwidth-efficient (i.e., compressed) representations of audio data can be utilized for near real-time presentation of the audio on one or more receiving devices. Persons identified as having speech represented in the audio data can have trained speech models provided to the devices. These trained models can be used to classify the compressed audio in order to improve the quality to correspond more closely to the uncompressed version, without experiencing lag that might otherwise be associated with transmission of the uncompressed audio. The uncompressed audio is also received, with potential lag, and is used to further train the speech models in near real time. The ability to utilize the uncompressed audio as it is received prevents a need to store or further transmit the audio data for offline processing, and enables the further trained model to be used during the communication session.

16 Claims, 6 Drawing Sheets

… (1)

ONLINE TRAINING WITH DELAYED FEEDBACK

BACKGROUND

Users are increasingly communicating electronically as opposed to using conventional telephonic systems. While such approaches can provide convenience in many instances, the quality of the communications can be limited by constraints such as available bandwidth of the connection. Sending raw audio data over a limited-bandwidth network connection can result in a lag or periodic delays in the audio transmission, which can negatively impact the experience of participants to the communication. Conventional approaches attempt to avoid these issues by compressing the audio to a bandwidth-friendly format, but such approaches can significantly reduce the overall quality of the transmitted signal.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the transmission of media files and streams. In particular, various approaches provide for the use of bandwidth-efficient (i.e., compressed) representations of audio data, or other such content, to provide for near real-time presentation of the content on one or more receiving devices. Persons identified as having speech represented in transmitted audio data can have trained speech models provided to the receiving devices. These trained models can be used to classify the compressed audio in order to attempt to improve the quality to correspond more closely to the uncompressed version, without experiencing lag associated with the uncompressed audio due to bandwidth or other potential limitations. The uncompressed audio can also be received, with some lag, but can serve as a ground truth for the speech data. This uncompressed audio can be used to further train the speech models in near real time, in order to enable the improved models to be used instantaneously for subsequent audio classification. Further, the ability to utilize the uncompressed audio as it is received on a communication session prevents a need to store or further transmit the audio data for offline processing.

Various other such functions can be used as well within the scope of the various embodiments as would be apparent to one of ordinary skill in the art in light of the teachings and suggestions contained herein.

Figure 1:
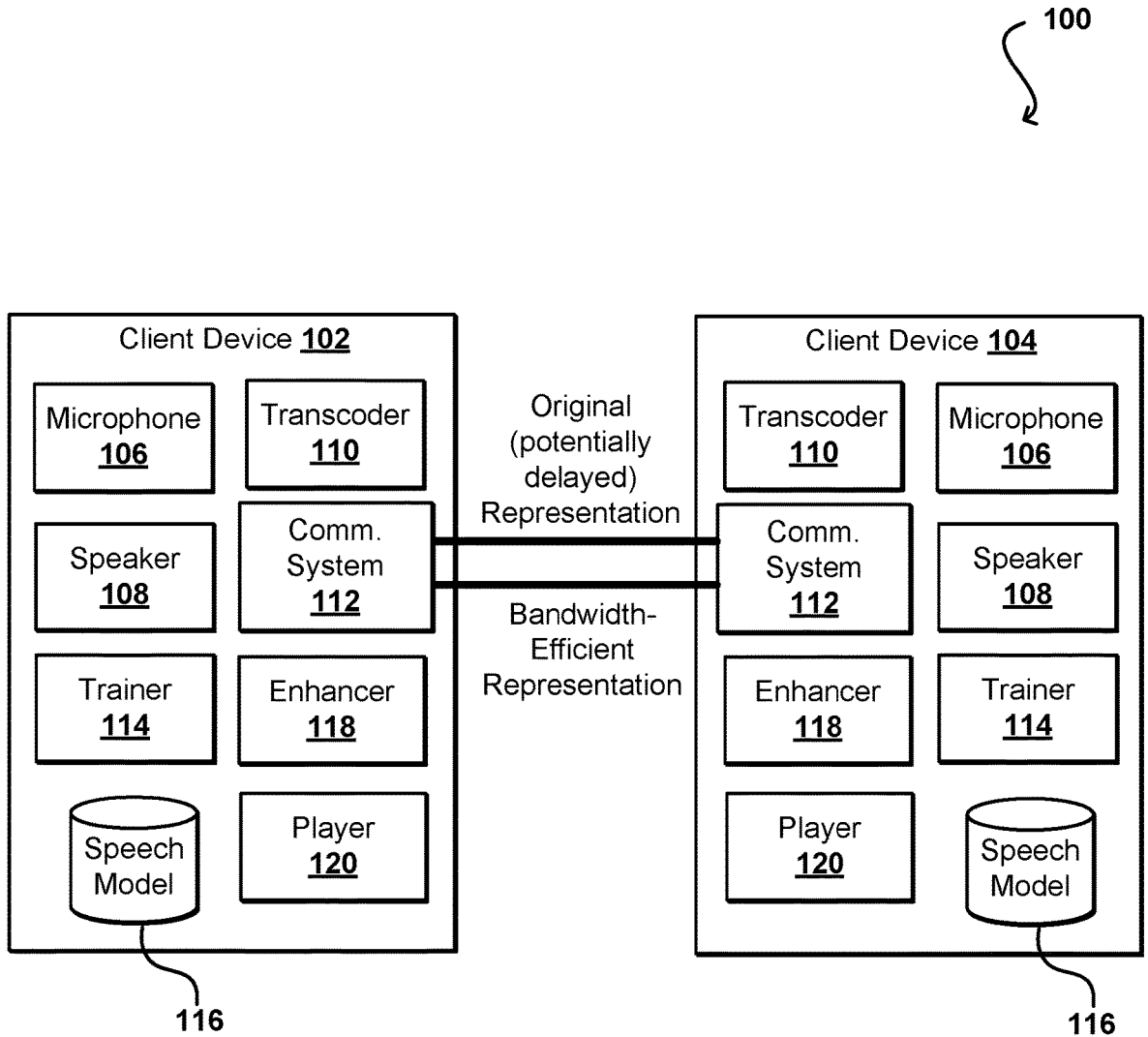
FIG. 1 illustrates components of a pair of client devices to a communication session that can be utilized in accordance with various embodiments.

FIG. 1 illustrates an example system 100 wherein two client devices 102, 104 are involved in a communication session, such as may involve a video conference or network-based audio call. The client devices can include any appropriate electronic devices operable to send and receive requests, messages, or other such communications over an appropriate network (not shown in FIG. 1) and convey information back to users of those devices. Examples of such client devices include personal computers, tablet computers, smart phones, notebook computers, wearable computers (e.g., smart glasses or watches), and the like. The communication network can include any appropriate network, including an intranet, the Internet, a cellular network, a local area network (LAN), or any other such network or combination, and communication over the network can be enabled via wired and/or wireless connections, and combinations thereof.

Each device can include components such as a microphone 106, or other audio capture mechanism, for capturing audio data, as may correspond to speech uttered by a person participating in the communication session. Each device can also include at least one speaker 108, or other audio generation or presentation mechanism, for playing or otherwise presenting audio received from the other client device. Various other audio capture and playback components can be utilized as well within the scope of the various embodiments.

As mentioned, in some instances a communication channel or network path between the client devices 102, 104 will be limited or restricted. This might correspond to limited bandwidth in some instances. Attempting to communicate using a relatively low bandwidth channel can result in a lag, or delays, in the transmitted signal. The lag can be frustrating for participants in the call, as there can be long delays or people can end up inadvertently talking over one another, among other such issues. Certain systems can attempt to avoid or minimize these issues by compressing the audio signal that is transmitted between the devices. While such an approach can minimize the delays, it can result in a lower quality audio transmission, which for low bandwidth connections may make the audio difficult to understand, or can at least negatively impact the experience of participants to the communication.

Accordingly, approaches in accordance with various embodiments can utilize a bandwidth-efficient representation of the audio for real-time transmission without significant bandwidth-induced delays, but can enhance the audio before play or other presentation to another participant to the communication. As illustrated, the devices can transmit both a bandwidth-efficient representation of the audio as well as the original (or at least less bandwidth-efficient) audio data as captured by the devices. As mentioned, the original or uncompressed audio will likely be received with at least some delay relative to the compressed, bandwidth-efficient representation of the audio. This uncompressed data can function as a delayed feedback mechanism, which serves as a source of truth or true labels for the audio data. A trained speech model 116 for each participant can be used to enhance the compressed audio transmitted in the bandwidth-efficient representation. An enhancer 118, which can be a separate component or a process within the transcoder 110 or media player 120, for example, can utilize the speech model 116 to enhance or improve aspects of the compressed audio once decoded. This can help to improve the quality of the audio played through the speakers 108 of the devices while avoiding the delays experienced by the uncompressed audio. For example, the speech model can include information about the pitch, timber, inflections, speech patterns, tone, accent, or other aspect of the person's speech, which can be applied to the compressed audio. As known for audio (and other media) compression, some amount of the detail in the signal will be lost. The information in the speech model can help to restore at least some of this detail. For example, the uncompressed audio can be passed through the trained speech model for the respective user, and the output can be what is referred to herein as an "enhanced" version wherein aspects of the uncompressed audio will have been modified to attempt to more closely match what is known or has been learned about the speech of the respective user, person, or audio source. In some embodiments, a trained model can be used to process very minimal audio input, or even text input, then generate audio that sounds very similar to raw audio as would be expected from the respective source. As the model becomes more accurate and the enhancements more precise, the audio can further compressed to allow for even more bandwidth-efficient representations to be transmitted during audio communication sessions.

The uncompressed data will be sent concurrently with the bandwidth-efficient representation, but with potentially a slight delay or with gaps due to bandwidth and other potential limitations. This uncompressed data can be used by training modules 114 on the devices when received, however, to further train the speech models 116 in near real time, or in an online fashion during (or at approximately the same time as) the communication session. Using such an approach, the audio data in compressed or uncompressed form does not need to be stored after use for training of the models, and in some embodiments can be buffered only long enough to be processed by the training module 114 on the respective client device. In this example, at least one transcoder 110 (or separate encoders and decoders) can be used to encode the compressed audio signal into the bandwidth-efficient representation and then decode the audio signal for presentation via one or more speakers. The decoded audio can be processed using the speech model 116 to enhance the audio before presentation. As illustrated, there may be an enhancement module 118 or other audio modification component that utilizes the speech model 116 to enhance the decoded audio before presentation through the speakers 108 of the relevant device. The communications, which can be separate channels or separate signals sent over a single channel in some embodiments, can be thought of as a human to human bandwidth-efficient encoded communication, used for presentation on the session, and a machine to machine raw audio signal with delays and lags that can be used for online updating of the relevant speech model, which in some embodiments can be a trained machine learning model as discussed in more detail elsewhere herein.

In some embodiments the audio communication session, which as mentioned can include video or other content in some embodiments, can be managed or hosted by a communication provider or other such entity. In such embodiments, the participating client devices 202, 204, 206 might send direct communications to each other through an application (or web page or other such interface) provided by the communication provider, or other such entity, to initiate and maintain the communication session (or other period of audio transmission). In other embodiments, the client devices 202, 204, 206 might first contact an address or interface provided through a communication provider environment 208, which can then initiate the session for the individual client devices. The communication provider environment 208, or other resource provider environment, can include any appropriate components for receiving requests and returning information or performing actions in response to those requests. As an example, the provider environment might include Web servers and/or application servers for receiving and processing requests, then returning data, Web pages, video, audio, or other such content or information in response to the request. In some embodiments the devices can then communicate with each other through one or more networks 222, such as the Internet, an intranet, or a cellular network as discussed herein, or can have the communications passed through the network(s) and the communication provider environment 208 to the various client devices, among other such options. An advantage to first contacting the resource provider environment 208 is that a model manager 216 of the environment can receive indication from a communication manager 210, or other such component, as to the participants to the call, conference, or other audio communication session. The communication provider environment 208 can maintain trained speech models in a model data store 218, or other such location, which can be transmitted to each participating client device for a particular session. In other embodiments each client device might store a trained model of a respective participant, or set of participants, and the devices can exchange models at the start of the communication session, among other such options.

In some embodiments each participant with have an account or profile stored in a user data store 214, which can be used to identify the respective speech model. If a participant is new or otherwise does not have a speech model stored, such as where the participant may not authorize the creation or training of a personalized model, an untrained model can be provided for that user that can be trained during the session using the raw audio data, for example, for use in classifying or enhancing the audio data for that user. The model can then be discarded or deleted at the end of the communication session if necessary, or can be transmitted to the communication provider environment 208 for storage if permitted. In some embodiments, information known about a participant can be compared against information in a parameter or profile data store 220 to determine likely speech information about the participant. For example, if the participant is an adult female from Mexico then she is likely to have different speech qualities than a teenage male from France. This information can be used, in some embodiments, to select a generic speech model that is likely to be closest to the model that would otherwise be trained for that participant based at least in part on the known user information. In some embodiments the communication provider environment can also test aspects of the communication connections and/or consult information in a communications data store 212 to determine an amount or type of compression that should be used for the communication session.

As mentioned, in some embodiments this can even include performing a speech-to-text processing of the audio and sending the text data, which can then be used with the speech model to generate an audio version of the text for the other participants. In some embodiments this may also impact the model selected or the way in which the model is applied, among other such options. After termination of a communication session, one or more of the individual devices can transmit their respective trained models to the communication provider environment 208 for storage. In some embodiments the communication provider environment might also receive the raw audio for the session, and can train the speech models for the various participants separately. Since the resource provider environment can have significantly more resources and capacity than any of the individual devices, a more robust or thorough training can be performed to attempt to generate the most accurate models possible. In at least some embodiments where there is more than one participant per device, a process such as voice recognition can be used to identify the person speaking at any particular point in time, and this information can be used to determine which speech model to apply to that portion of the audio data, or which model should be trained using that portion of the audio.

Figure 3:
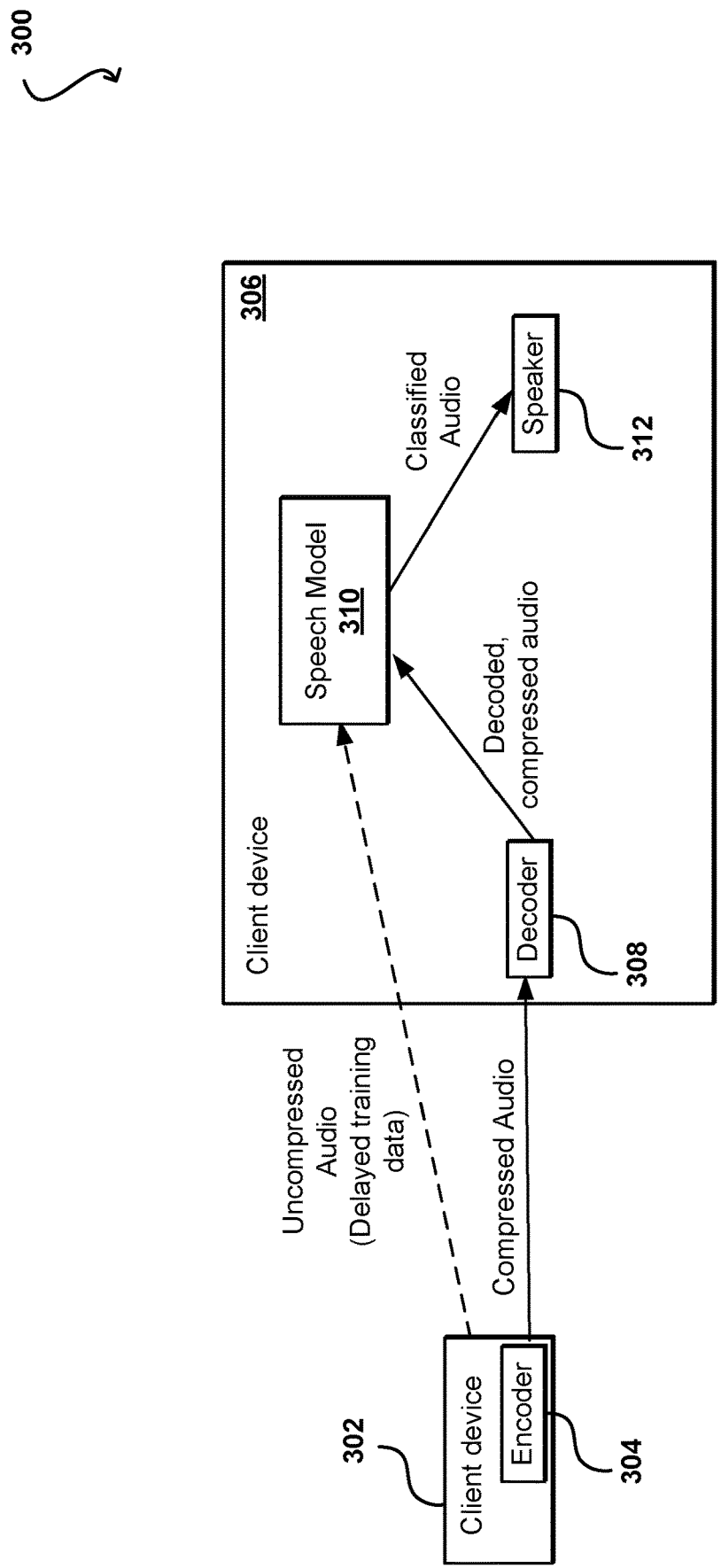
FIG. 3 illustrates an example flow of audio transmissions on a communication session that can be generated in accordance with various embodiments.

FIG. 3 illustrates an example flow 300 of the audio signals for a pair of client devices 302, 306 that can be utilized in accordance with various embodiments. In this example, a client device 302 captures raw audio that is to be conveyed to at least a second client device 306. As utilized herein, "raw" audio refers to audio data captured or otherwise obtained by a device without compression, encoding, or other such processing. This can correspond to, for example, the unaltered audio data as captured by a microphone assembly of the client device. As mentioned, the audio can be encoded into compressed audio (e.g., MP3, AAC, FLAC, or Opus audio) or another bandwidth-efficient representation, before being transmitted to the second client device 306, wherein a decoder 308 can decode the encoded audio signal. As mentioned, the decoded audio data will differ from the raw audio data due at least in part to the compression. Contemporaneously with the transmission of the compressed audio, the uncompressed audio or raw audio data can also be transmitted to the second client device 306. As mentioned, there may be some encoding or compression of the raw audio in some embodiments, but the amount of compression, encoding, or other processing of the raw audio will be significantly less than that performed for the compressed audio in at least some embodiments, to allow for accurate training of the speech model 310 for the participant.

In this example, the decoded but compressed audio can be processed using the trained speech model 310. This can include adjusting or modifying the audio signal based at least in part upon the trained model. A machine learning model can be used, as discussed in more detail elsewhere herein, to predict features of the raw audio data or classify the features of the decoded audio based on the trained model. The resulting audio data, which should correspond to enhanced audio but will at least be modified based on the trained model, can then be provided to the speaker assembly 312 on the device for presentation to the participant(s) using the second client device to participate in the communication. As mentioned, the classified audio that was generated can be compared against the uncompressed audio to determine which modifications were correct, which were incorrect, or how the classification could otherwise have been more accurate. This information can be used to train the speech model 310 on the client device 306 during (or at least contemporaneous with) the communication session. The training during the session enables the most accurate adjustments to be made, as the model is current with, and represents, the current speech aspects of the relevant person or source. The speech model, trained on how to convert a lower quality audio signal to a higher quality audio signal in this example, can then be applied to the compressed audio to attempt to predict or classify the appropriate higher-quality signal.

As mentioned, in some embodiments the compressed and uncompressed audio signals can be sent through separate channels, and potentially even through different networks or types of connections. In other embodiments the signals can be combined or transmitted through a single channel using multiplexing or another such approach to enable the signals to be separated accordingly once received. In alternative embodiments, the raw data may not be transmitted at all but instead used to train a local model for the speaker in real time, which can then be exchanged with other devices for future communications. Further, additional or alternative types of data can be processed using such approaches as well. This can include, for example, video data, augmented or virtual reality content, animation or game content, and the like. Advantages of bandwidth-efficient representations are also not limited to the communication-specific examples discussed herein, but can apply to any transmissions where bandwidth or throughput may be an issue, as may correspond to streaming audio or video, online gaming, social media applications, and the like.

Various types of deep learning or machine learning can be used to train models such as the speech models discussed herein. These can include, for example, generative adversarial networks (GANs), convolutional neural networks (CNNs), recurrent neural networks (RNNs), transfer learning, domain adaptation, neural style transfer, and the like. The training and use of these models can vary, but can each be used to process and classify compressed audio and other such data. In general, these models or neural networks are trained using an initial training session including classified data, which for speech models could include raw speech data stored for a specific user. Iterative learning can then be used to present additional data, such as subsequently captured audio data (e.g., the raw uncompressed audio) with different weightings for various inputs values being adjusted to be able to predict the correct class labels for aspects of the input data. These aspects (such as pitch, timber, and the like) can then be predicted for an input compressed audio signal received on a session, and applied to provide the modified or enhanced audio to be played for the session. The raw audio will subsequently be received that corresponds to the processed audio, and the raw data can be used as a ground truth to further iteratively train the model to improve future classifications or predictions. Advantages of using neural networks include the fact that the networks are generally not sensitive to noise in the training data, and the ability to classify patterns on which the networks have not previously been trained, such as specific words, phrases, or expressions that have not previously been encountered for a user. Errors in the classifications can be propagated back through the network in order to further train the model and improve its accuracy.

In some embodiments it will be necessary for the training of the models (speech or otherwise) to extract the relevant features or aspects of the audio data. Various data and/or feature extraction tools can be used to extract these features. The tools can include, for example, Spark, Hive, Scala, Term Frequency-Inverse Document Frequency (TF-IDF), Word2Vec, and the like. These tools can be used to identify and extract the features from the raw data, which can then be scaled, converted, modified, or otherwise processed as appropriate. Example feature transformer tools include Normalizer, SQL transformer, Tokenizer, PCA, and the like. A selection of a subset of features can then be performed as well using a selection tool such as ChiSqSelector or VectorSlicer, among other such options. Various other machine learning models and training techniques can be used as well as would be apparent to one of ordinary skill in the art in light of the teachings and suggestions contained herein. Approaches such as neural style transfer may be advantageous for instances where the style of speech for a user is to be applied to a text string or conversation transcript to sound as if the audio is actual speech data for that user. When training data is received, the features can be extracted and labeled using these processes, then provided to the learning algorithm which can help to train the relevant model. The initial set of features to be extracted can be determined using one or more problem framing processes, and some amount of data pre-processing or cleaning may be utilized in at least some embodiments. Various parameter tuning and model evaluation procedures can be used in the training process as well as known in the art for such purposes.

As mentioned, the models can be generated, stored, and/or managed in a content or resource provider environment. In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. An example provider environment includes a plurality of electronic resources of one or more types. These types can include, for example, application servers operable to process instructions provided by a user or database servers operable to process data stored in one or more data stores in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

Figure 2:
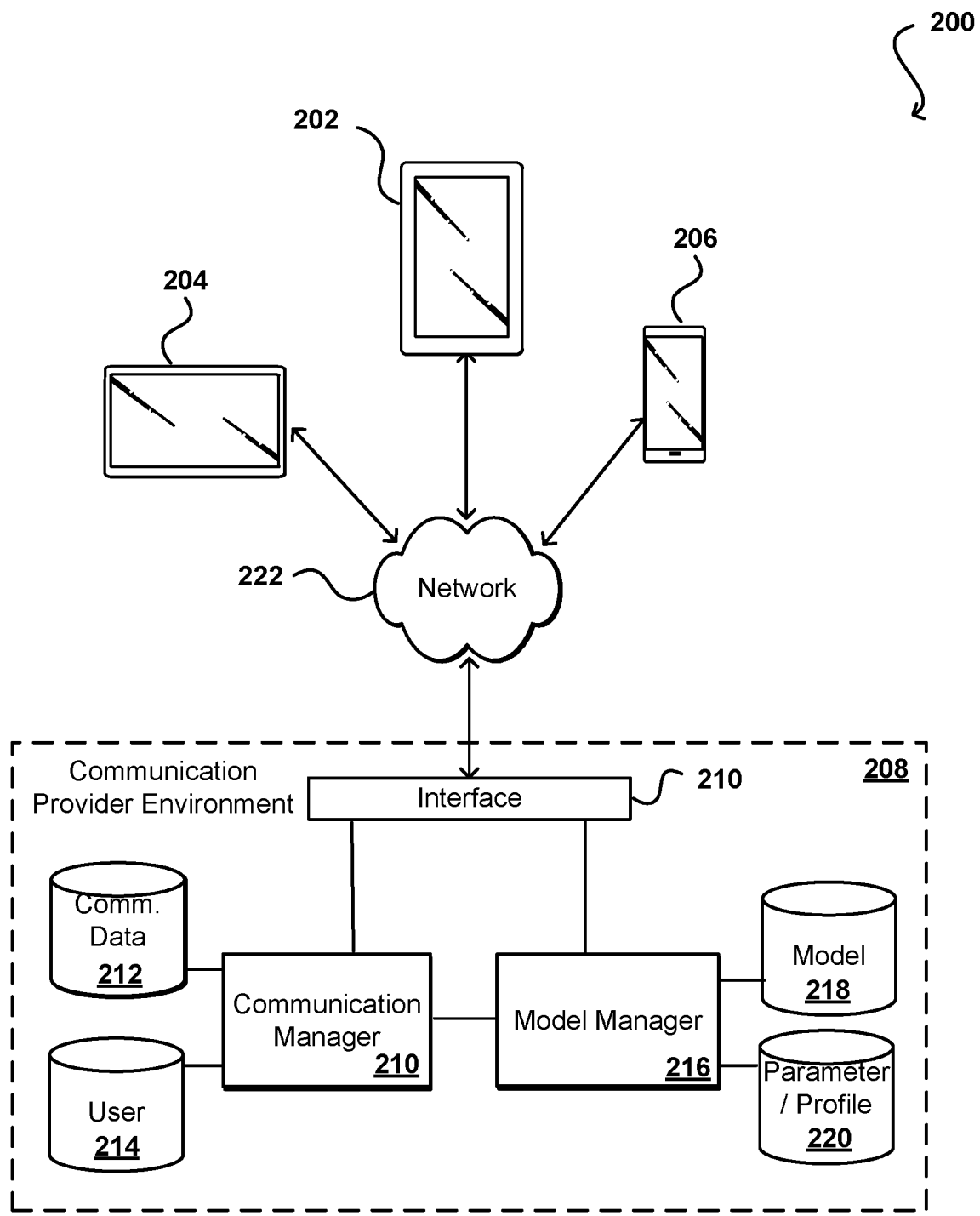
FIG. 2 illustrates an example environment in which various embodiments can be implemented.

In at least some embodiments, a user wanting to utilize a portion of the resources can submit a request that is received to an interface layer 210 of the provider environment 208 as illustrated in FIG. 2. The interface layer can include application programming interfaces (APIs) or other exposed interfaces enabling a user to submit requests to the provider environment. The interface layer in this example can also include other components as well, such as at least one Web server, routing components, load balancers, and the like. When a request to provision a resource is received to the interface layer, information for the request can be directed to a resource manager or other such system, service, or component configured to manage user accounts and information, resource provisioning and usage, and other such aspects. A resource manager receiving the request can perform tasks such as to authenticate an identity of the user submitting the request, as well as to determine whether that user has an existing account with the resource provider, where the account data may be stored in at least one data store in the provider environment. A user can provide any of various types of credentials in order to authenticate an identity of the user to the provider. These credentials can include, for example, a username and password pair, biometric data, a digital signature, or other such information.

The resource provider can validate this information against information stored for the user. If the user has an account with the appropriate permissions, status, etc., the resource manager can determine whether there are adequate resources available to process the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device to communicate with an allocated resource without having to communicate with the resource manager, at least until such time as a relevant aspect of the user account changes, the user is no longer granted access to the resource, or another such aspect changes. The resource manager (or another such system or service) in this example can also function as a virtual layer of hardware and software components that handles control functions in addition to management actions, as may include provisioning, scaling, replication, etc. The resource manager can utilize dedicated APIs in the interface layer, where each API can be provided to receive requests for at least one specific action to be performed with respect to the data environment, such as to initiate a communication session or obtain a speech model, among other such options. Upon receiving a request to one of the APIs, a Web services portion of the interface layer can parse or otherwise analyze the request to determine the steps or actions needed to act on or process the call. For example, a Web service call might be received that includes a request to generate a default speech model for a new user.

An interface layer in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

In at least some embodiments a communication manager might specify one or more sets of encoding parameters to be used for a communication session. A transcoder can use the profile and parameter data to determine the appropriate encoding information for the encoding of the compressed audio. In some embodiments a transcoding subsystem includes one or more transcoders that can include both encoders and packagers. A packager can receive a signal (e.g., feed), such as a captured audio signal or a live stream. The live stream feed may comprise live content or pre-recorded content to be provided for presentation during the session. The packager may receive one or more input signals (e.g., input) and generate one or more bitstreams. The bitstreams can represent various encoded/packaged versions of the signal feed, as may be encoded per the encoding parameters from the transcoding manager and selected for transmission based upon current network conditions or other such options. The number and/or types of the bitstreams may be varied per the profile or other data. In many embodiments, a single stream or transmission of compressed audio data will be generated.

Figure 4:
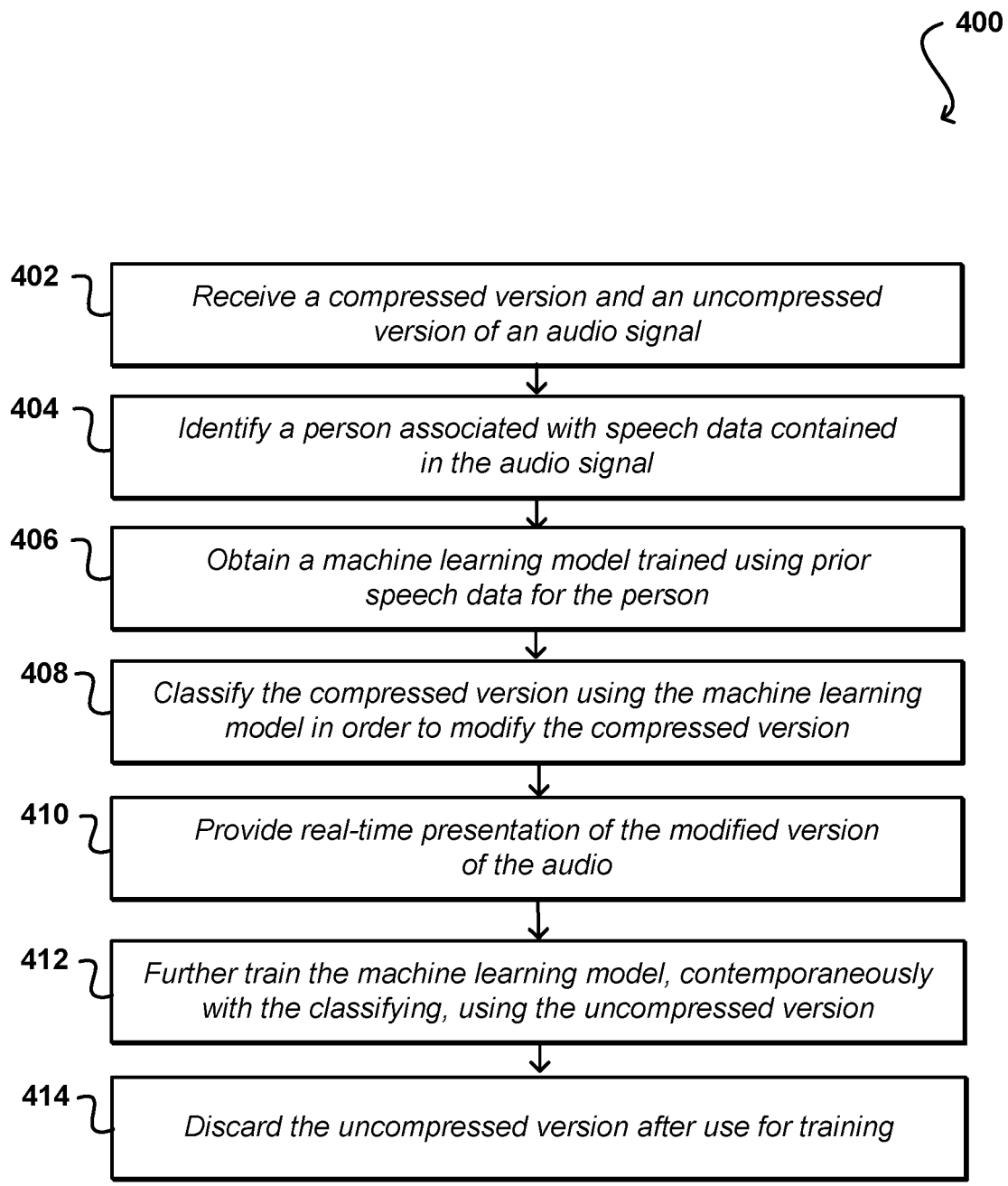
FIG. 4 illustrates an example process for using a trained speech model for improving bandwidth-efficient audio representations that can be utilized in accordance with various embodiments.

FIG. 4 illustrates an example process 400 for using a trained machine learning model to modify a compressed version of an audio signal for presentation that can be utilized in accordance with various embodiments. It should be understood that for any process herein there can be additional, fewer, or alternative steps performed in similar or alternative orders, or in parallel, within the scope of the various embodiments unless otherwise specifically stated. In this example, both a compressed version and an uncompressed version of an audio signal are received 402, such as by a client device computing in a communication session or being a party to an audio transmission. It should be understood that there can be other versions transmitted as well as discussed herein, such as may include a higher quality and a lower quality version of a media transmission, among other such options. During, or prior to, the receiving, a person associated with speech data contained in the audio signal can be identified 404. The identification can happen in a number of different ways, such as may be based upon login information provided by the user, identification information provided by the user, user information associated with a client device, or voice recognition of a known user, among other such options. In many instances an identified person will have an account or profile that can be used to determine or locate information about that person. Based at least in part upon the identity information, where available, a machine learning model can be obtained 406 that has been at least partially trained using prior speech data for that person. If no speech model exists for that person, or if the person is unable to be identified, then a general or base speech model can be provided as discussed elsewhere herein. In at least some embodiments, the model will be obtained by a client device that is to receive the audio signal and provide presentation of the audio signal for a participant in the audio session or transmission.

The compressed version can correspond to a bandwidth-efficient representation that will be received with minimal delay or lag, which can be utilized for (near) real-time presentation, such as during a video conference or IP telephony call. The compressed version can be classified 408, or the relevant feature parameters predicted, using the relevant machine learning model. If there are multiple participants represented in the audio then multiple machine learning models may be used as appropriate. The result of the classifying can be a modified version of the compressed audio that should be improved or enhanced to more closely match the uncompressed version. As mentioned, the uncompressed audio may experience significant lag or delay, such that it is not optimal for real-time presentation on a communication session. The modified version allows for near-uncompressed quality with almost none of the lag experienced by the uncompressed version. Real-time presentation of the modified version of the audio can then be provided 410 by the corresponding presentation device. As mentioned, the uncompressed version of the audio will also be received, although likely with some amount of delay. The machine learning model can be further trained 412 using the uncompressed data to provide for more accurate classification of subsequent audio data. The training can occur contemporaneously with the classification and/or presentation, such that the training occurs in near real time. Since the training occurs as the uncompressed data is received, the uncompressed data does not have to be stored or transmitted to another location for offline processing. Accordingly the updated model can be used as soon as it is updated, and the uncompressed version of the audio can be discarded 414 after use for the real-time training. As mentioned herein, there may be some amount of buffering of the audio to allow for the training, but there will be no long-term or persistent storage of the data unless otherwise indicated or instructed.

Figure 5:
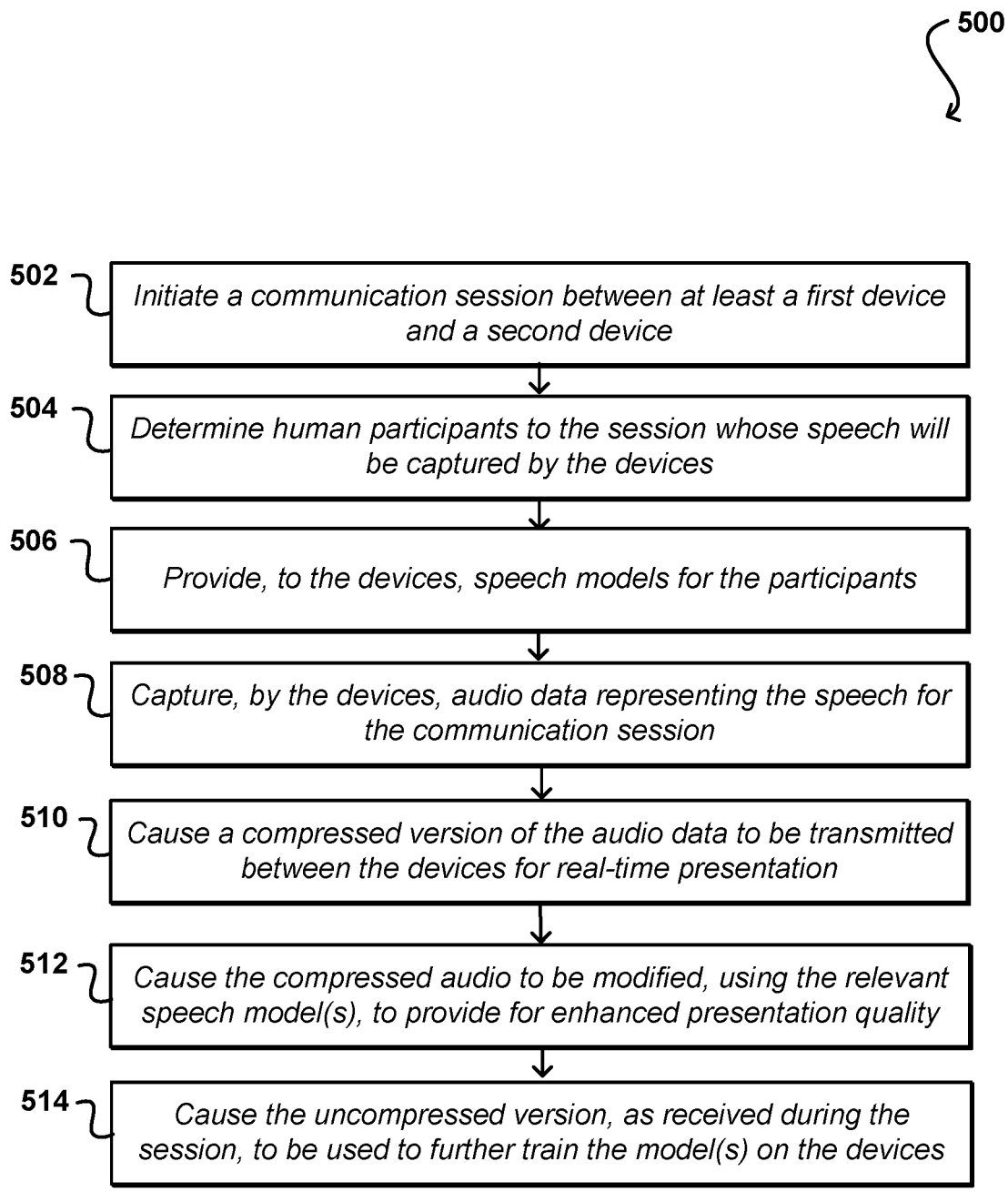
FIG. 5 illustrates an example process for performing real-time training of speech models for participants of a communication session that can be utilized in accordance with various embodiments.

FIG. 5 illustrates an example process 500 for modifying audio transmitted on a communication session that can be utilized in accordance with various embodiments. In this example, a communication session is initiated 502 between at least a first device and a second device. As mentioned, in some embodiments there may be multiple devices participating in such a session, where each device can correspond to one or more human (or other) participants in the session. In this example, the human participants to the session are determined 504 whose speech may be captured by the respective devices. As mentioned, there may be sources of audio (or other data) beyond human participants as well in accordance with various embodiments. Based at least in part upon the identities of the participants, corresponding speech models can be provided 506 to the participating devices. As mentioned, these models can be trained using prior speech data for the respective human (or other) participants, or can be generic speech models for unidentified participants or participants without a trained model. The models can also be provided to some or all of the devices for purposes of improving the quality of the audio played on the session.

During the communication session, audio data representing speech of participants to the session can be captured 508, such as by using one or more microphones of the corresponding devices. As known for audio communications, the audio data can be pre-processed or encoded for transmission and presentation. A compressed version of the audio data can be caused 510 to be transmitted between the devices for presentation as part of the communication session. As mentioned, presentation can include playing the compressed audio through one or more speakers after decoding, among other such options. Other processing of the audio data can be performed as well, which can result in a lower quality, but bandwidth-efficient, representation of the audio data. As mentioned, however, this lower quality representation can be received by the other device(s) with minimal lag or delay, allowing for real-time presentation on the communication session. The compressed audio can be caused 512 to be modified using the relevant speech model(s) for human participants whose speech is represented in the compressed audio. As mentioned, this can involve providing the compressed audio as input to the trained model which can predict or classify values for various features of the audio in order to provide what should be a higher quality version of the audio, closer to the uncompressed version, which can provide for enhanced presentation quality. This can include, for example, modifying aspects such as the pitch, timber, tone, or accent of the audio based on respective aspects learned for the participants using the trained speech models.

As mentioned, the uncompressed version of the audio data will also be received by the devices, although likely with some amount of delay or lag in many instances. The uncompressed data can be received over a separate channel or connection from the compressed data in some embodiments. The uncompressed data will provide for delayed feedback, but will also represent a sort of ground truth for the speech data as it will be close to, if not a match for, the raw captured audio data. The uncompressed version, or at least the relevant portion(s), can be caused 514 to be used by the devices (or a subset of the devices and/or an external device) to further train the relevant speech models. As mentioned, this training will be performed in near real time, as the uncompressed data is received during the communication session. As the training is performed when the uncompressed data is received, there is no need (at least for training purposes) to store or further transmit the uncompressed data, which can be discarded after the training. The further trained models are then instantly available for use in classifying subsequent audio, and can be transmitted to other devices and/or a logically central location for use in other audio sessions.

Figure 6:
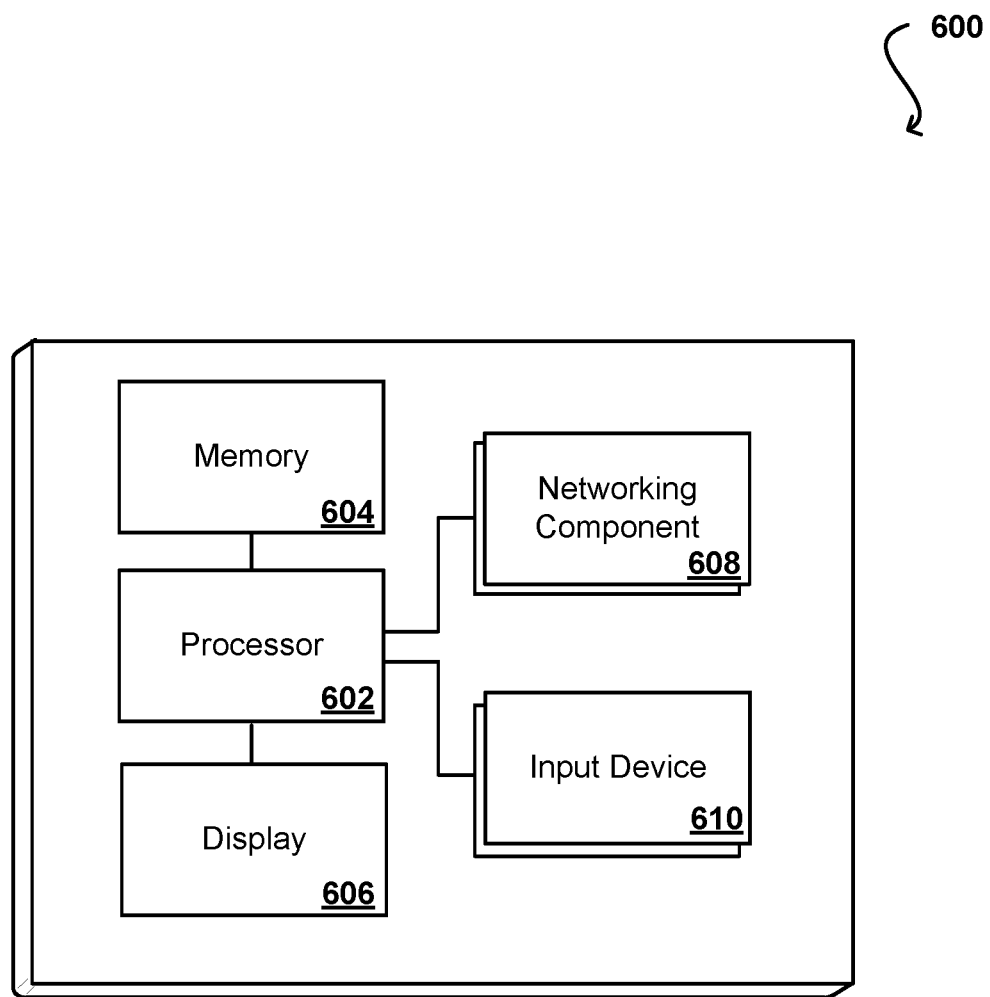
FIG. 6 illustrates example components of a computing device that can be used to implement aspects of various embodiments.

FIG. 6 illustrates a set of basic components of an example computing device 600 that can be utilized to implement aspects of the various embodiments. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the at least one processor 602, the same or separate storage can be used for images or data, a removable memory can be available for sharing information with other devices, and any number of communication approaches can be available for sharing with other devices. The device may include at least one type of display element 606, such as a touch screen, electronic ink (e-ink), organic light emitting diode (OLED) or liquid crystal display (LCD), although devices such as servers might convey information via other means, such as through a system of lights and data transmissions. The device typically will include one or more networking components 608, such as a port, network interface card, or wireless transceiver that enables communication over at least one network. The device can include at least one input device 610 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail.

Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    initiating an audio communication between a first communication device, associated with a first person, and a second communication device, associated with a second person;
    identifying the first person;
    causing the second communication device to obtain a speech model for the first person, the speech model generated by an initial training using prior speech data for the first person;
    causing audio, spoken by the first person and captured by the first communication device, to be encoded into a compressed version;
    causing an uncompressed version of the audio to be transmitted to the second communication device along with the compressed version;
    causing the second communication device to generate decoded audio from the compressed version;
    causing at least a portion of the decoded audio to be modified, using the speech model for the first person, for audio presentation via the second device; and
    causing the speech model to be further trained, during the audio communication, based at least in part on the speech model and the uncompressed version of the audio, substantially contemporaneously as the uncompressed version is received, the uncompressed version capable of being received with a delay relative to receiving of the compressed version.

2. The computer-implemented method of claim 1, further comprising:
    causing the first communication device to obtain a second speech model for the second person;
    causing audio, spoken by the second person and captured by the second communication device, to be encoded into a compressed version;
    causing an uncompressed version of the audio to be transmitted to the first communication device along with the compressed version;
    causing the first communication device to generate decoded audio from the compressed version;
    causing the decoded audio to be modified, according to the second speech model for the second person, for audio presentation via the first device; and
    causing the second speech model to be further trained, during the audio communication, using the uncompressed version of the audio as the uncompressed version is received.

3. The computer-implemented method of claim 1, further comprising:
    training the speech model to classify one or more features of the decoded audio selected from the group consisting of a pitch, timber, tone, inflection, accent, pattern of speech, or pace of speech of the first person.

4. The computer-implemented method of claim 1, further comprising:
    initiating the audio transmission as part of a communication session involving at least the first communication device and the second communication device, the communication further including at least video content captured using at least one of the first communication device or the second communication device.

5. The computer-implemented method of claim 1, further comprising:
    causing the portion of the decoded audio to be modified to cause one or more features of the compressed version to more closely resemble corresponding features of the uncompressed version.

6. A computer-implemented method, comprising:
    receiving a compressed version and an uncompressed version of an audio signal;
    training a machine learning model based at least in part on the uncompressed version of the audio signal, the training the machine learning model including an initial training using prior speech data for a person having speech represented in the audio signal;
    initiating an audio session between a first device, associated with the person, and a second device receiving the audio signal;
    obtaining a trained speech model for the person; and
    classifying, substantially contemporaneously with the training of the machine learning model and based at least in part the trained speech model, the compressed version of the audio signal using the trained machine learning model.

7. The computer-implemented method of claim 6, further comprising: identifying the person using at least one of login information for the person, information associated with the first device, or voice recognition.

8. The computer-implemented method of claim 6, further comprising:
    determining a set of features representative of human speech for use in training the machine learning model, the set of features including at least one of a pitch, timber, tone, inflection, accent, pattern of speech, or pace of speech of the person.

9. The computer-implemented method of claim 6, further comprising:
    buffering the uncompressed version for use in training the machine learning model; and
    discarding the uncompressed version after the training.

10. The computer-implemented method of claim 6, further comprising:
    identifying a plurality of persons having speech represented in the audio signal; and
    training a respective machine learning model for each of the plurality of persons, the respective machine learning models used to classify portions of the audio corresponding to speech of the corresponding persons.

11. The computer-implemented method of claim 6, further comprising:
    decoding the compressed version before the classifying.

12. The computer-implemented method of claim 6, further comprising:
    receiving the compressed version and the uncompressed version contemporaneously over separate communication channels.

13. The computer-implemented method of claim 6, wherein the machine learning model is based on one of a generative adversarial network (GAN), a convolutional neural network (CNN), a recurrent neural network (RNN), transfer learning, domain adaptation, or neural style transfer.

14. A system, comprising:
- at least one processor; and
- memory including instructions that, when executed by the system, cause the system to:
- receive a compressed version and an uncompressed version of an audio signal;
- train a machine learning model based at least in part on the uncompressed version of the audio signal, the training the machine learning model including an initial training using prior speech data for a person having speech represented in the audio signal;
- initiate an audio session between a first device, associated with the person, and a second device receiving the audio signal;
- obtain a trained speech model for the person; and
- classify, substantially contemporaneously with the training of the machine learning model and based at least in part the trained speech model, the compressed version of the audio signal using the trained machine learning model.

15. The system of claim 14, wherein the instructions when executed further cause the system to: identify the person using at least one of login information for the person, information associated with the first device, or voice recognition.

16. The system of claim 14, wherein the instructions when executed further cause the system to:
- determine a set of features representative of human speech for use in training the machine learning model, the set of features including at least one of a pitch, timber, tone, inflection, accent, pattern of speech, or pace of speech of the person.

* * * * *